US005598639A

United States Patent [19]
Webb

[11] Patent Number: 5,598,639
[45] Date of Patent: Feb. 4, 1997

[54] TOOL FOR HIGH TEMPERATURE ROLL NIP MEASUREMENTS

[75] Inventor: Michael B. Webb, Rochester, N.Y.

[73] Assignee: Xerox Corporation, Stamford, Conn.

[21] Appl. No.: 477,686

[22] Filed: Jun. 7, 1995

[51] Int. Cl.$^6$ ................................................ G01B 7/14
[52] U.S. Cl. ...................................... 33/784; 33/657
[58] Field of Search ............................... 33/533, 613, 645, 33/657, 711, 784; 73/862.55

[56] References Cited

U.S. PATENT DOCUMENTS

| | | | |
|---|---|---|---|
| 3,760,637 | 9/1973 | Budinger et al. | 73/141 R |
| 3,906,800 | 9/1975 | Thettu | 73/432 R |
| 3,926,058 | 12/1975 | Thetter | 73/432 R |
| 3,983,631 | 10/1976 | Dutzler | 33/657 |
| 4,397,097 | 8/1983 | Damrau et al. | 33/182 |
| 4,489,495 | 12/1984 | Scheinecker | 33/657 |
| 4,744,253 | 5/1988 | Hermkens | 73/862.55 |

FOREIGN PATENT DOCUMENTS

| | | | |
|---|---|---|---|
| 991626 | 5/1965 | United Kingdom | 33/657 |
| 2066473 | 7/1981 | United Kingdom | 33/657 |

OTHER PUBLICATIONS

Lindenfelser, William M., "Fuser Nip Length Sensor"Xerox Disclosure Journal, vol. 15, No. 4 Jul. 1 Aug. 1990, pp. 231–232.

Fromm, Paul Michael, "Dynamic Nip Width Determination With FRS Sensor", Xerox Disclosure Journal, vol. 15, Nov./Dec., 1990, pp. 441–442.

Lindensfelser, William M., "A Fuser Nip Sensor for Determining Nip Pressure and Length", Xerox Disclosure Journal, vol. 18, No. 4 Jul/Aug. 1993, pp. 359–361.

*Primary Examiner*—G. Bradley Bennett

[57] ABSTRACT

Disclosed is a roll nip tool for making nip width measurements within a high temperature roll nip. The tool includes a first thin section for inserting into the high temperature roll nip. The first thin section includes a first surface that has a first portion of an electrical circuit formed thereon. The first thin section also includes a second thin member that has a second surface and a second portion of the electrical circuit formed thereon. The first thin member and the second thin member are attached together to form a pocket, and are arranged together such that the first and the second portions of the electrical circuit can be brought together into circuit closing contact within the pocket. The first thin section of the tool further includes a mechanism or suitable means such as pressurized air within the pocket for normally keeping the electrical circuit open by controllably separating the first and the second portions of the electrical circuit. The tool then includes a second section connected to the first thin section for indicating the achievement of closing contact between the first and the second portions of the electrical circuit.

28 Claims, 7 Drawing Sheets

TOOL FOR HIGH TEMPERATURE ROLL NIP MEASUREMENTS

BACKGROUND OF THE INVENTION

This invention relates to nip width measuring devices, and more particularly to a tool for effectively measuring the nip width of high temperature roll nips, such as high temperature fuser roll nips in electrostatographic reproduction machines.

In industry, substrate handling machines in which paper, film, or other thin substrate material are conveyed, typically use a combination of at least a pair of rolls or rollers that are pressed against each other to form a nip by which, and through which the thin substrate material is conveyed. In electrostatographic reproduction machines which produce toner copies of images, a pair of fusing rollers, (one of which is heated and the other a pressure roller) are used to form a fusing or fuser roll nip. Loose powder toner images formed on a copy substrate, such as a copy sheet of paper, are fed through the fuser roll nip in order to heat, fuse and permanently fix the toner image to the copy substrate. The fuser roll nip width is very important. If the overall pressure is too light, there will not be enough heat transfer to adequately bond the toner to the paper, this will cause the print to deteriorate. Also, if there is an uneven pressure distribution along the roll, the paper will not track straight as it passes through the rolls. For best fusing results, it is desirable to have close control over the temperature and pressure applied to, as well as the dwell time within the nip of, each unit area of toner powder images being fused and fixed. To achieve such control, the nip width of the fuser roll nip must be set accurately during machine manufacture, as well as later on, on a regular basis, in the field due to wear, and to the effect of machine jams.

In general, as two nip-forming cylindrical rolls or rollers are pressed against each other to form a nip, there exists a two-dimensional plane or area of contact between the rollers. In electrostatographic reproduction machines, the geometry of this contact area directly impacts the quality of the fused toner images reproduced. In particular, as each copy sheet travels through the fuser roller nip, its path of travel may vary if the contact geometry is not symmetric along the center of the rollers. A non-symmetric contact geometric area ordinarily results in either sheet skew, or copy damage. In addition, if the nip geometry is out of tolerance, the powder toner may not be fused properly onto the copy sheet.

Because the width of a fuser nip can significantly impact copy quality, there exists a need for a tool to measure it. The primary limitation of conventional tools in measuring nip width is the operating temperature of the rolls. For example, in most electrophotographic reproduction machines, the fuser roll temperature is approximately 400° F. This greatly exceeds the operating temperatures of most nip sensing technologies currently available.

Some known devices for making measurements within roll nips, in order to achieve and maintain close control, are disclosed for example in the following references. U.S. Pat. No. 3,760,637 issued Sep. 25, 1973, to Budinger et al., for example, discloses a tool for measuring the pressure exerted at the nip between two rolls. The tool includes a thin-walled, non-rigid tube, a fluid conduit, means for pressurizing fluid passed through the conduit, and means for measuring the fluid pressure when it is balanced by the nip pressure.

U.S. Pat. No. 3,906,800 issued Sep. 23, 1975, to Thettu, discloses a reusable nip measuring device and method. The device consists of two polyimide sheets each having a thickness of 3 to 8 nido, and one of which is coated with silicone rubber material. When placed in the heat and pressure nip of a fuser for a determined period, the silicone rubber sheet forms an impression on the uncoated sheet corresponding to the contact arc of the nip.

U.S. Pat. No. 3,926,058 issued Dec. 16, 1975, to Thettu, discloses a device for measuring the contact arc and pressure characteristics of a roll fuser nip. The device consists of silicone rubber layer into which a toner powder pattern is formed and fused, and of a sheet of paper placed of the toner powder pattern. When the device as arranged is placed in the heat and pressure nip of a fuser for a determined period, a portion of the powder pattern corresponding to the contact arc is offset onto the sheet of paper.

U.S. Pat. No. 4,397,097 issued Aug. 9, 1983, to Damrau et al. discloses a gauge for measuring the size of a roll nip. The gauge includes a cylindrical carrier enclosing a pivotal platform. It also includes a U-shaped rod or probe and a transducer mounted on the platform. In use, the medial portion of the U-shaped probe is moved into the nip until the carrier contacts the rolls, so that the transducer can give a readout in accordance with the radii of the rolls at the point of contact by the probe.

U.S. Pat. No. 4,744,253 issued May 17, 1988, to Hermkens discloses a system for determining the pressure in the nip between two rollers. The system includes a pressure sensor and a device for transmitting an ultrasonic wave in the sensor, and receiving a reflected pulse thereof. According to the system, a time difference between a transmission pulse and its reflected pulse is related to the pressure exerted on an object in the nip.

Xerox Disclosure Journal, Vol. 15, No. 4, July/August 1990 discloses a fuser nip length sensor consisting of a thin profile linear potentiometer. The potentiometer includes a voltage divider consisting of a strip of resistive material, a series of taps therealong, force sensitive switches and a common terminal. When placed longitudinally within the nip, only a portion of the potentiometer corresponding to the length of the nip will be compressed.

Xerox Disclosure Journal, Vol. 15, No. 6 November/December 1990 discloses a tool for measuring fuser nip pressure. The tool includes short force sensing resistors placed over metallic conductors constructed in an interdigitated pattern and mounted between two polymer sheets forming a network. Two metallic strips running the entire length of the tool connect the network to a measurement device. When the tool is inserted in a nip, pulses from the force sensing resistors are timed, and the time data is used along with fuser speed to calculated nip width.

Xerox Disclosure Journal, Vol. 18, No. 4 July/August 1993 discloses a fuser nip sensor for determining nip pressure and nip length. The tool also includes short force sensing resistors in addition to two sensor heads placed in proximity to the nip for determining nip length.

SUMMARY OF THE INVENTION

Pursuant to an aspect of the present invention, there is provided a roll nip tool for making nip width measurements within a high temperature roll nip. The tool includes a first thin section for inserting into the high temperature roll nip. The first thin section includes a first surface that has a first portion of an electrical circuit formed thereon. The first thin section also includes a second thin member that has a second surface and a second portion of the electrical circuit formed thereon. The first thin member and the second thin member are attached together to form a pocket, and are arranged together such that the first and the second portions of the electrical circuit can be brought together into circuit closing contact within the pocket.

The first thin section of the tool further includes a mechanism or suitable means such as pressurized air within the pocket for normally keeping the electrical circuit open by controllably separating the first and the second portions of the electrical circuit. The tool then includes a second section connected to the first thin section for indicating the achievement of closing contact between the first and the second portions of the electrical circuit.

In accordance with another aspect of the present invention, there is provided a method of measuring a contact width of a high temperature roll nip formed by two rollers. The method includes the step of inserting into the roll nip formed by the two rollers, a thin section, of a roll nip tool that includes a first thin member and a second thin member which form a pocket. The method next includes applying contact pressure to the rollers so as to bring a first surface of the first thin member which has a series of equally spaced conductive strips thereon extending axially relative to the rollers, and which each form a first portion of an electrical circuit, into electrical circuit closing contact, with a second surface of the second thin member. The second surface of the second thin member has a conductive contact finger extending perpendicularly to the axes of the rollers.

The method then includes the step of introducing into the pocket a non-conductive means for separating the conductive strips on the first surface of the first thin member, in non-nip contact areas, from the conductive contact finger on the second surface of the second thin member. The method finally includes the step of calculating a contact width of the roll nip by determining a number of axially extending conductive strips brought into circuit closing contact with the conductive finger, and multiplying such number by a strip-to-strip spacing value.

BRIEF DESCRIPTION OF THE DRAWINGS

Other features of the present invention will become apparent as the following description proceeds and upon reference to the drawings, in which.

DETAILED DESCRIPTION OF THE PREFERRED EMBODIMENT OF THE INVENTION

While the present invention will be described below in connection with respect to a fusing nip in the exemplary electrostatographic machine and as a particular preferred embodiment thereof, it will be understood that it is not intended to limit the invention to just that use or just that embodiment. On the contrary, it is intended to cover all alternatives, modifications, and equivalents as may be included within the spirit and scope of the invention as defined by the appended claims.

Figure 9:
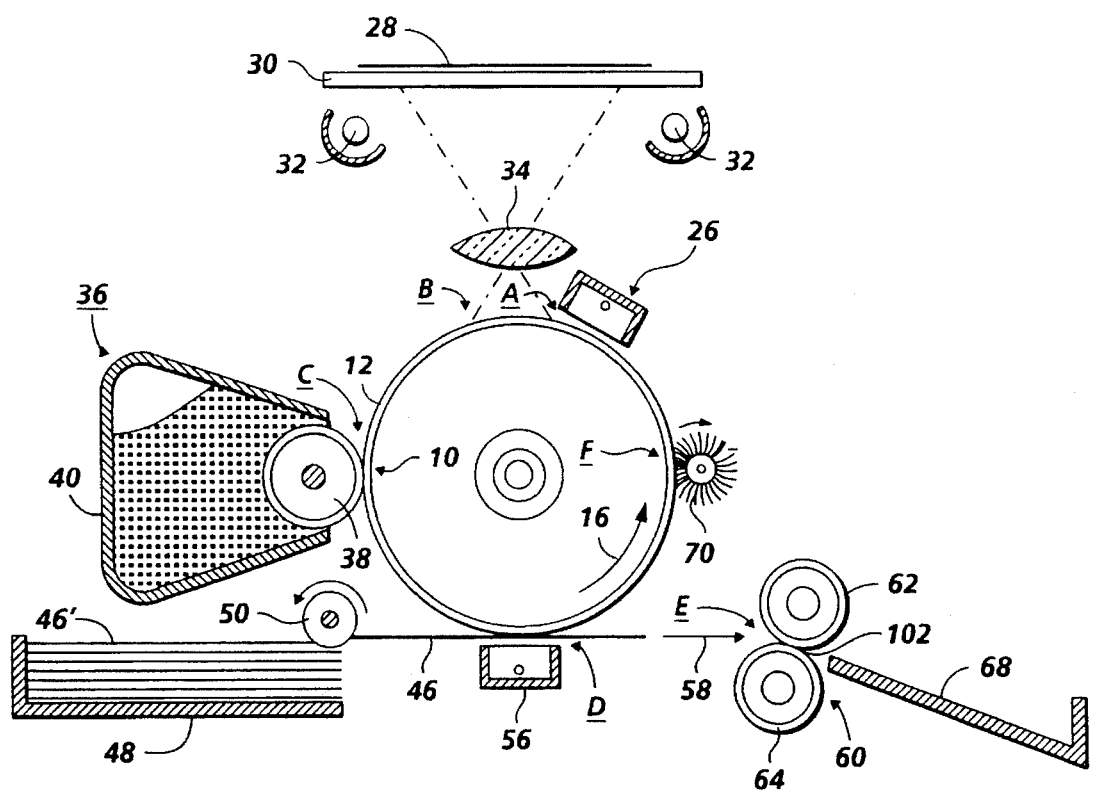
FIG. 9 is a schematic of an exemplary electrostatographic reproduction machine including a fusing apparatus and fusing nip for use with the tool of the present invention.

Referring initially to FIG. 9, an exemplary electrostatographic reproduction machine in which the present invention can be effectively used, is illustrated. The exemplary electrophotographic machine, for example, employs a photoreceptive member shown as a drum 10 including a photoconductive surface 12. As is well known, the photoconductive member can equally be a suitably mounted belt having a photoconductive surface. The photoconductive drum 10 is coupled to motor (not shown) for rotation about a process path in the direction of arrow 16 for advancing successive portions of photoconductive surface 12 through various processing stations disposed about the process path.

Initially, a surface portion of drum 10 passes through a charging station A. At charging station A, a corona generating device 26 charges photoconductive surface 12 to a relatively high and substantially uniform potential.

Once charged, photoconductive surface 12 is advanced to an imaging station B where an original document 28, positioned face down and in accordance with a fixed registration mark or position on a transparent platen 30, is exposed to light from light sources, such as lamps 32. Light rays from the lamps 32 are reflected imagewise from the document 28 thus forming a light image of the original document 28. The reflected rays are transmitted through a lens 34 and focused onto a portion of the charged photoconductive surface 12, selectively dissipating the uniform charge on impacted areas thereof. As such, an electrostatic latent image corresponding to the original document 28 is recorded onto photoconductive surface 12.

Although an optical system has been shown and described for forming the light image used to selectively discharge the charged photoconductive surface 12, one skilled in the art will appreciate that a properly modulated scanning beam of energy (e.g., a laser beam) may equally be used to imagewise irradiate the charged portion of the photoconductive surface 12 in order to record the latent image thereon.

After the electrostatic latent image is recorded on photoconductive surface 12, drum 10 advances to development station C where a development apparatus 36, deposits developing material containing charged toner particles onto the electrostatic latent image. Development apparatus 36 for example may include a single developer roller 38 disposed in a developer housing 40. The developer roller 38 rotates, bringing the developing material into contact with photoconductive surface 12, thus developing the latent image into a visible toner image.

After development of the electrostatic latent image as such, drum 10 advances the toner image to transfer station D. At transfer station D, a sheet of support material 46 is moved into contact with the toner image by means of a sheet feeding apparatus 48. Preferably, sheet feeding apparatus 48 includes a feed roller 50 which rotates while in contact with a stack of sheets 46' to advance the uppermost sheet. The advancing sheet of support material 46 is moved into contact with photoconductive surface 12 of drum 10 at transfer station D in a timed sequence so that the developed image on the surface 12 contacts the advancing sheet of support material 46, and is transferred. A transfer corotron 56 is provided for projecting ions onto the backside of sheet 46 in order to aid in inducing the transfer of charged toner images from the photoconductive surface 12 onto support material 46.

The support material 46 is subsequently transported in the direction of arrow 58 for advancement to a fusing station E. Fusing station E is suitable for using the roll nip tool of the present invention, and includes a fuser assembly 60 for heating and permanently affixing the transferred toner image to sheet 46. Fuser assembly 60 preferably includes a heated fuser roller 62 and a support roller 64 forming a fusing nip 102 for receiving and transporting a sheet of support material 46 therethrough. Within the fusing nip 102 as discussed above, the temperature is maintained about 400° F., so that loose powder toner forming images on the copy sheet of support material or substrate 46 are heated, fused and permanently fixed by contact pressure between the two rolls to the sheet. The actual contact arc or area of the nip 102 as determined by the width of the roll nip is therefore very important. If the overall pressure is too light because of poor, little or non-continuous contact, there will be insufficient heat transfer to the toner, as well as insufficient pressure to adequately fuse and bond the toner to the sheet. This, of course, will cause the resulting fused image or print to be of poor quality.

In addition, if there is an uneven pressure distribution along the length of the nip from one end to the other of the rolls, the sheet will likely not track straight as it passes through the nip. For best fusing results, it is desirable, therefore, to have close and precise control over the temperature and pressure applied to, as well as the dwell time of the toner image within the fusing nip. The tool of the present invention (to be described in detail below) is particularly useful for achieving such close and precise control. The tool is particularly useful for setting nip width of the fuser roll nip accurately during machine manufacture, as well as on a regular basis in the field to correct changes in initial settings due to machine wear and tear, and to the effects of machine jams.

Still referring to FIG. 9, after the toner image on the sheet 46 is fused as above, the sheet 46 of support material is moved to a receiving tray 68 for subsequent removal by an operator. Invariably, after the support material 46 was separated from the photoconductive surface 12 of drum 10, some residual developing material remained adhered to drum 10. Thus, a final processing station, namely cleaning station F, is provided for removing residual toner particles from photoconductive surface 12 in preparation for subsequent charging and imaging as described above. Cleaning station F, for example, can include a rotatably mounted fibrous brush 70 for physical engagement with photoconductive surface 12 in order to remove toner particles therefrom.

The foregoing description is believed to be sufficient, for purposes of the present application for patent, to illustrate the general operation of an electrostatographic reproduction or printer machine including the self-aligning corona generating or charging device of the present invention.

Referring now to FIGS. 1 to 4 the roll nip tool of the present invention is shown generally as 100, and is suitable for making nip width measurements within a high temperature roll nip, for example, a measurement of the nip width W1 (FIG. 2) of the fuser roll nip 102 of the electrostatographic reproduction machine 10.

As illustrated, the roll nip tool 100 includes a first thin section 104 for inserting into the high temperature fuser roll nip 102. The first thin section 104 consists of multilayer high temperature flexible films that are made from the same material found in high temperature flexible electrical circuitry. For example, each layer or film of the first thin section 104 is made from a polyimide based material that is coated with a layer of copper, in the same manner as is practiced in flex or flexible electrical circuit technology. The copper coating on the film is then chemically etched to a desired configuration or pattern.

Accordingly, the first thin section 104 includes a first thin member or film 106 for inserting into the high temperature fuser roll nip 102. The first thin member or film 106 has a first surface 108 and a first portion 120 of an electrical circuit formed on the first surface 108. The first portion 120 of the electrical circuit includes a series of conductive parallel interdigitated strips 110. These strips 110 are arranged so as to run in a first direction on the first section 104. Preferably, the first direction is parallel to the axis of the rolls 62, 64 forming the nip 102 when the first section of the tool is inserted into the nip for measurements.

According to the present invention, the parallel conductive strips 110 each have a constant and equal width, and are equally spaced from one another. For example, each strip 110 of the series of parallel conductive strips has a width of 4 mils, and each is spaced 4 mils from adjacent strips. The center-to-center or strip-to-strip spacing of the strips is therefore known, and is, for example, 4 mils.

Figure 1:
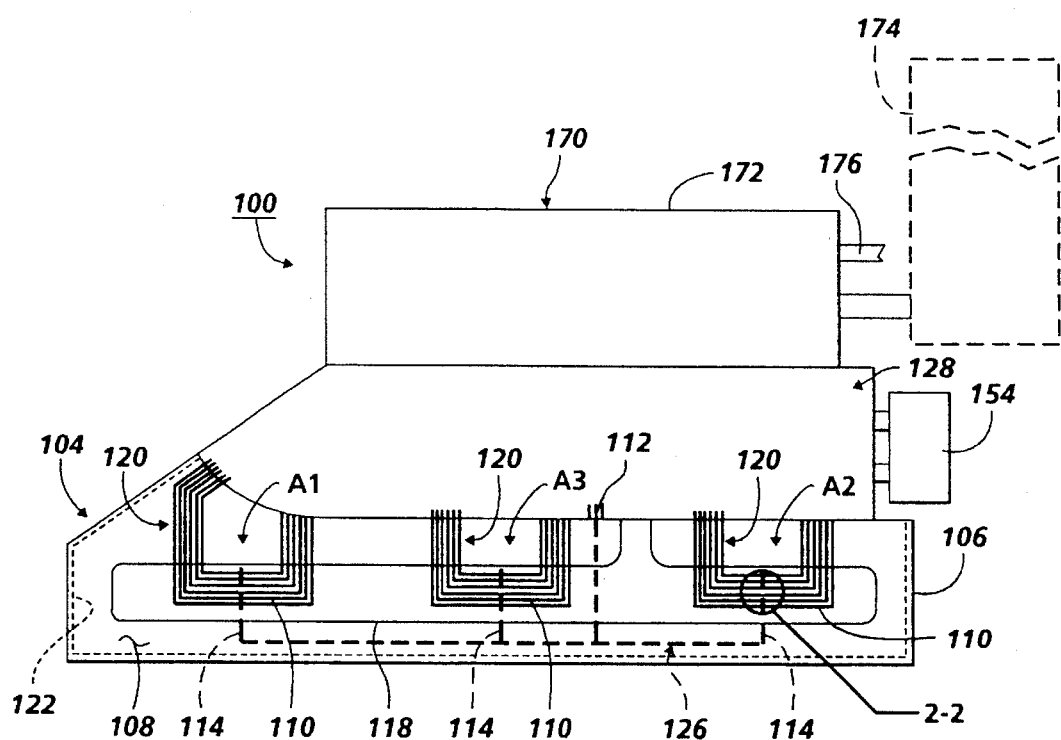
FIG. 1 is a schematic top view the flexible film circuit portion and control portion of the roll nip tool of the present invention.

The first thin section 104 also includes a second thin member or film 122 that has a second surface 124 and a second portion 126 of the electrical circuit formed on the second surface 124. The second portion 126 of the electrical circuit includes at least a conductive contact finger 114 that is arranged to run in a second direction that is perpendicular to the axis of the rolls when the tool is inserted into the roll nip 102. The conductive contact finger 114 is about 4 mils wide, for example, and is located midway between the ends of an area containing a series of the conductive strips 110. As shown in FIG. 1, the surface 108 includes three areas A1, A2, and A3 each containing a series of the strips 110. There is one area towards each end of the surface 108, and a third area A3 located midway between the first and the second ends of the first surface. Further, in accordance to the present invention, each conductive contact finger 114 is connected to an operational amplifier 112. Each operational amplifier preferably has two modes of operation, an analog mode and a digital mode.

The first electrical portion 120, and the second 126 in each area are constructed so that the contact finger 114 therein cooperate with the conductive strips 110 in the area to each form one closed electrical circuit for each strip 110.

Figure 2:
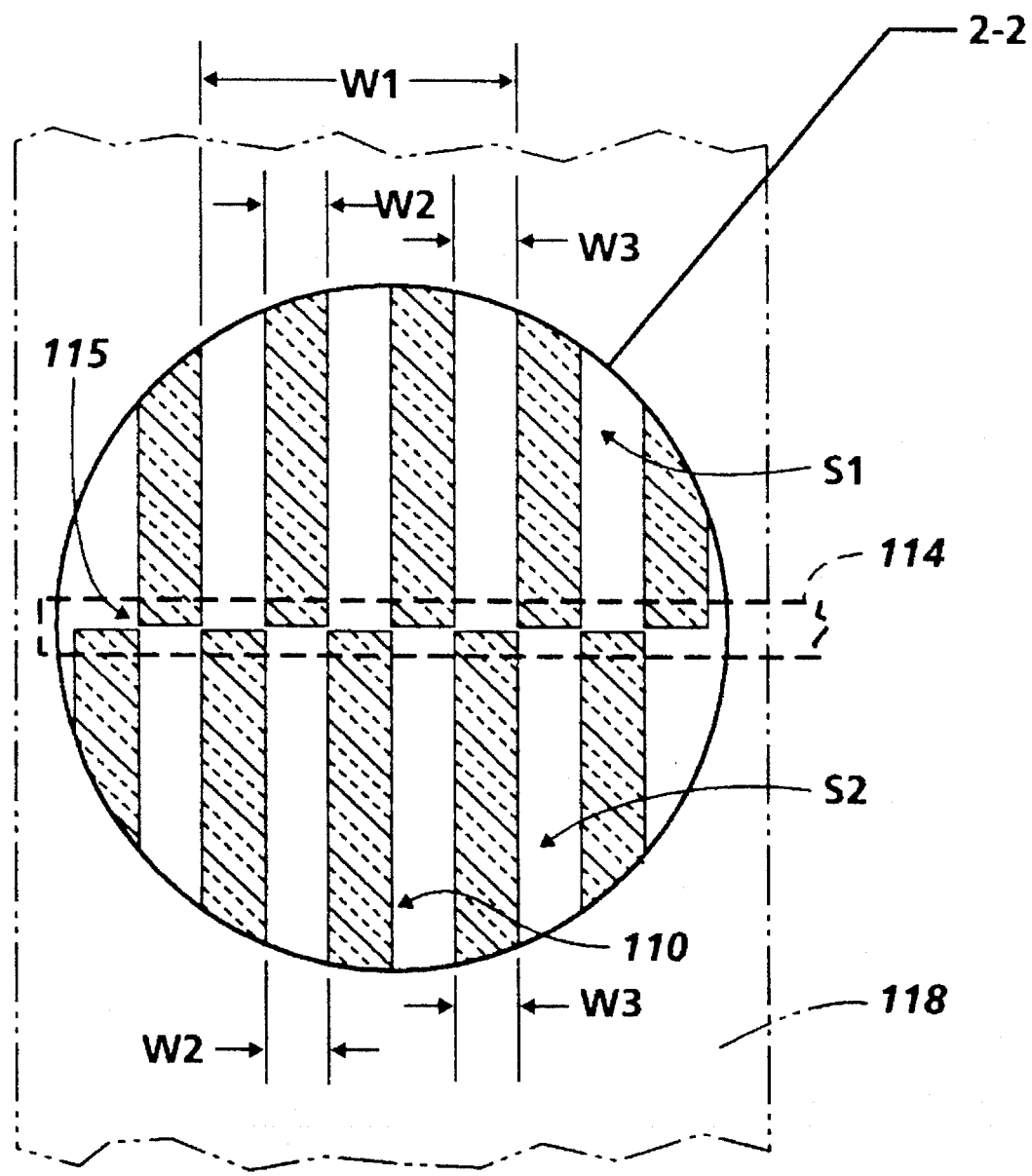
FIG. 2 is an illustration of the interdigitated nature of the conductive strips of the tool of the present invention.

The details of the arrangement of the contact conductive finger 114 relative to the series of conductive strips 110 in each of the three areas A1, A2, A3 are shown in FIG. 2 which is an enlargement of the circled portion 2—2 of FIG. 1. As shown, within each area, the series of conductive strips 110 are divided into two sets S1 and S2 with each strip having an end at the midway point 115 of the area. As shown, the contact conductive finger 114 on the second surface 124 is arranged to be aligned over the midway point 115 and in position to contact the strips in both sets S1 and S2. Each strip in the first set S 1 has a width "W2", for example, 4 mils, and is spaced a distance "W3" from an adjacent strip as shown.

In order to fully cover and be able to measure contact within, the nip area between the two rolls 62, 64, the series of strips in set S1 are interdigitated with those in set S2 as shown. As such, each strip area in set S1 is continued as a gap or strip-spacing area of the same size in set S2. The gap in set S2 across from a strip with a width "W2" in set S1, also has a width "W2" Similarly, a gap or space in set S1 each with a width "W3" are continued as strips in set S2 each with a width "W3" as shown.

The first thin member or film 106 and the second thin member or film 122 are assembled together such that each conductive strip 110 of the first electrical circuit portion 120 in each of the three areas, and the conductive contact finger 114 of the second portion 126 can be brought together in the respective areas into an electrical circuit closing contact. However, in order to normally maintain each electrical circuit in an open state, the first thin section 104 further includes a mechanism or means such as a pocket 118 containing pressurized air 116 for controllably and normally separating in each area the strips 110 from the finger 114 of the first and the second portions 1203, 126 respectively. Such normal air pocket separation is preferably maintained until these portions 120, 126 are forced together into contact as, for example, by the loading forces F1, F2 or pressure in areas "WI" of the nip 102 where the rolls are actually in contact with each other.

Figure 3:
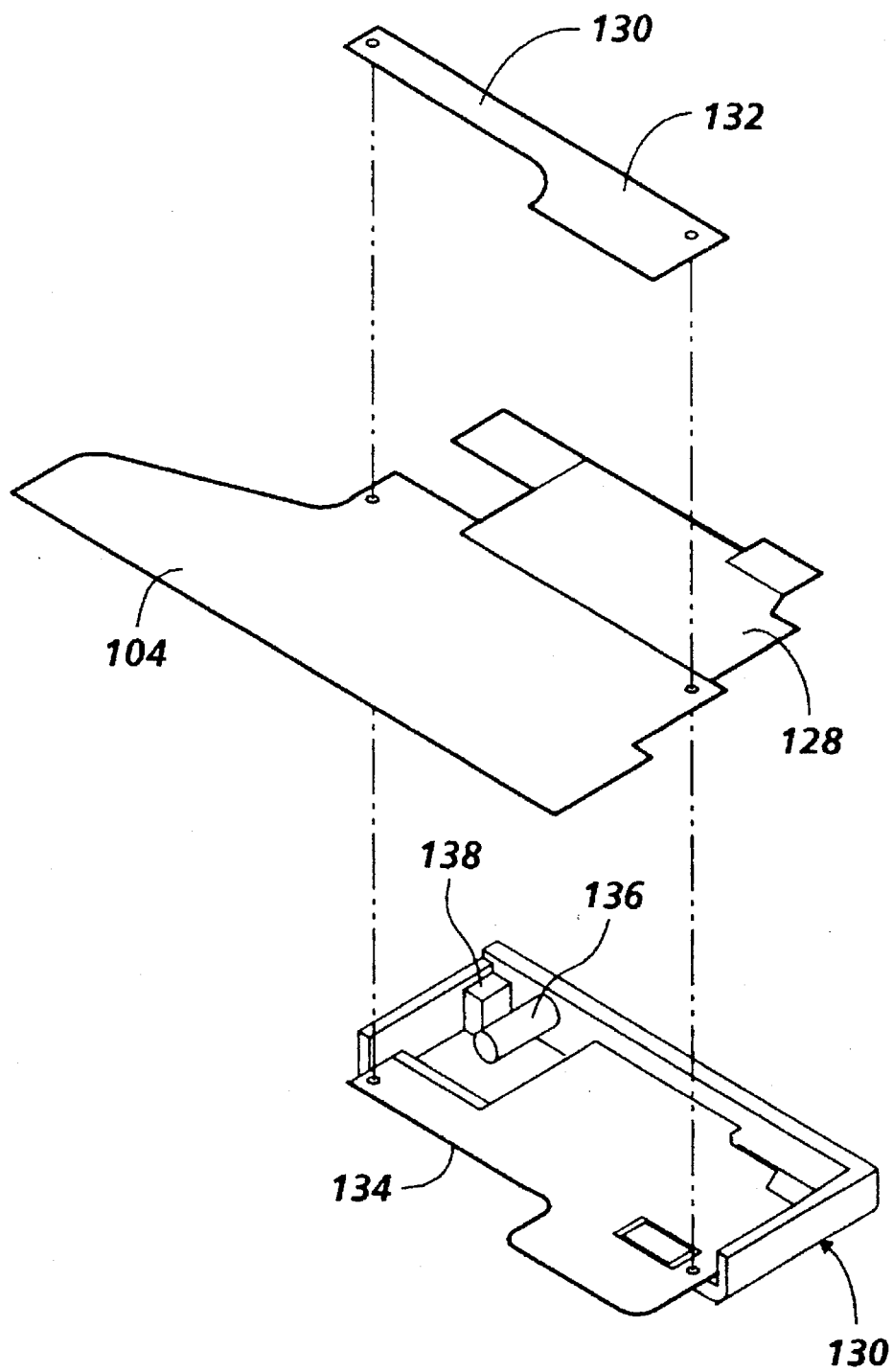
FIG. 3 is a schematic exploded view of one embodiment of the nip tool of FIG. 1.
Figure 4:
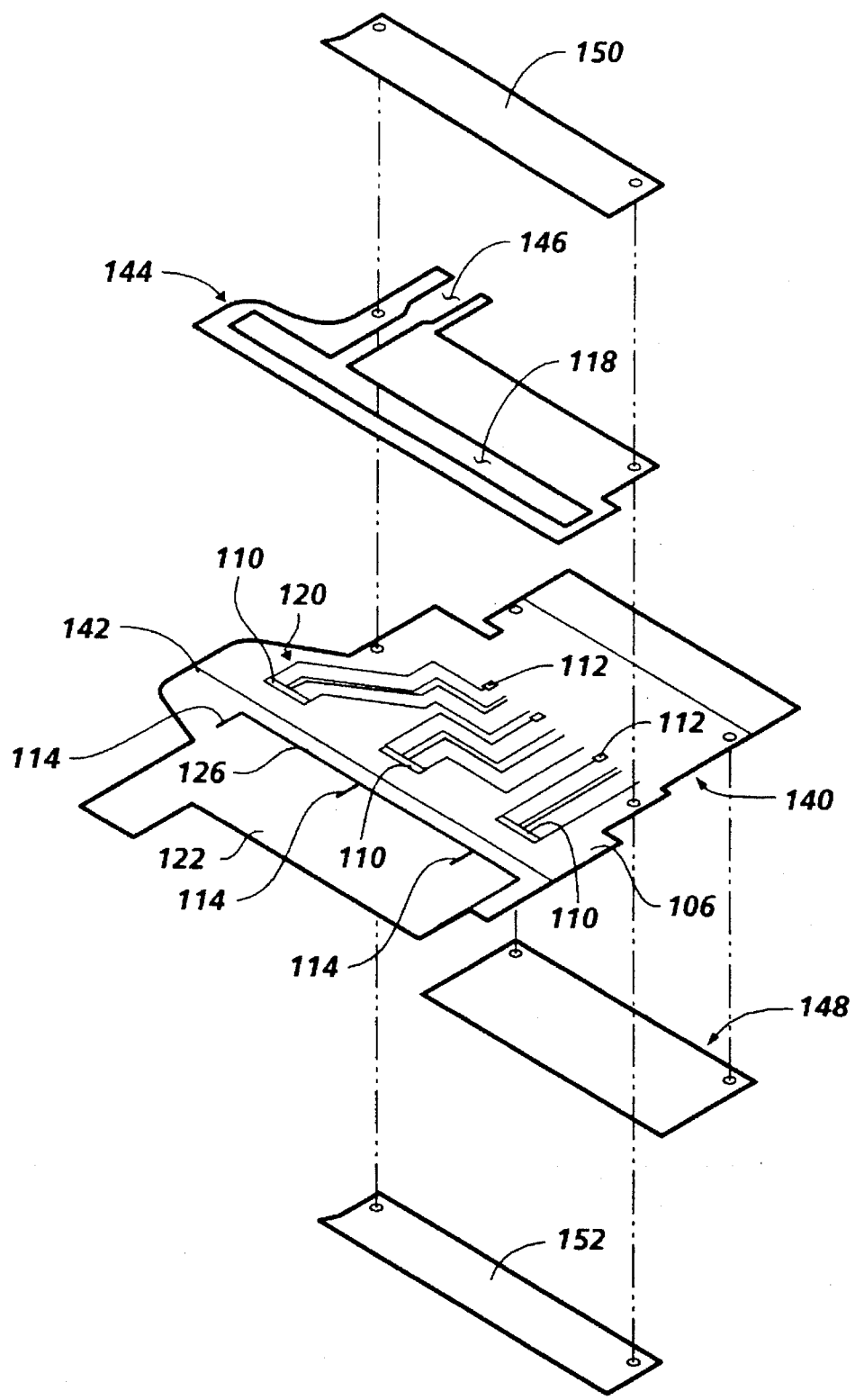
FIG. 4 is a schematic exploded view of an assembly of the flexible film circuit portion of the tool of FIG. 3.

Referring now, in particular, to FIGS. 3 and 4 exploded schematics of the assembly of the first embodiment of the tool 100 are illustrated. As shown, a fraction of the first section 104, and an electrical components area 128 of the tool are sealed between sections of a housing 130. The housing 130 has a top section 132, and a lower section 134 that additionally encloses a pressurized air supply solenoid 136 and an air pressure sensor 138.

As shown in FIG. 4, the first section 104 consisting of the first and second thin films 106 and 122 can be initially created on a single large film 140, and then folded along a line 142 into the first and second films 106, 122. A shaped air pocket transfer tape 144, for example, may be aligned over the conductive strips 110 for sealing the first film 106 to the second film 122 so as to form the pocket 118 and a passage 146 to a source of pressurized air including the solenoid and sensors 136, 138.

Preferably, in order to prevent the strips or traces 110 of the first section 104 from fatiguing at solder joints when they are repeatedly flexed during use of the tool, horizontal and vertical aluminum bars (not shown) and strain relief layers 150, 152 are provided in the housing 130 along with a flex backer board 148. In addition, the copper strips or traces 110 in the contact area of the tool should be tin-plated as by immersion in order to prevent copper oxidation. This is because if the copper were allowed to oxidize, the electrical contact resistance of their circuits would dentrimentally increase significantly.

Still referring to FIGS. 1–4, the roll nip tool also includes a second section 170 that is connected to, or associated with the first thin section 104. The second section 170 includes a computer interface 172 for connecting to a computer 174 that has suitable means, such as a liquid crystal display for indicating a degree of closing contact between the first and the second portions 120, 126 of the electrical circuit.

In the first embodiment of the tool 100 as shown in FIGS. 1–4, all strips or traces 110 (about 384 of them, for example) are interfaced, for example, to a personal computer 174 in order to allow real time nip width monitoring. In this embodiment, the second section 170 consists of a computer interface module 172 for communicating with the computer 174. As shown, the computer interface module 172 is mounted to a top part of the tool 100. In operation, this module 172 sequentially selects one of the interdigitated strips at a time and pulls it low. The computer 174 which is hooked up to the tool in any well known manner, then looks to see whether or not the contact finger 114 in each area A1, A2, A3 was also pulled low by the conductive strip.

Figure 5:
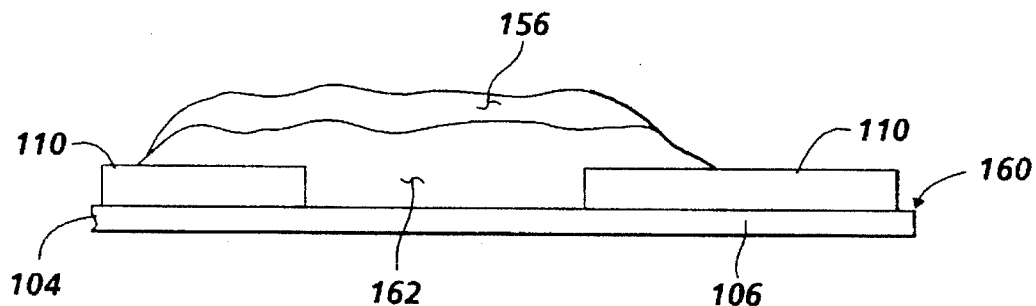
FIG. 5 is a schematic of a section of the flexible film circuit portion of a second embodiment of the tool of the present invention.

Referring now to FIG. 5, a second embodiment of the tool 100 is illustrated, and represents a scaled down version that is suitable for use as a field tool. It includes an enlarged part of an alternative pad display portion 160 extending from and connected electrically by the strips 110 to the first section 104 thereof. This display pad is located far away from the thin section 104 which is insertable into the hot nip 102. The parts of this version of the tool are initially and essentially as shown in FIGS. 1–4, and include the flex circuit portion 104, a source including Solenoid and sensor 136, 138 of low pressure air, and a battery 154 or other source of electrical power for use to activate or "develop" a layer 156 of thermoionic ink. This version or embodiment does not need an interfaced computer for scanning each of the strips. Instead, it includes a pad display 160 that extends from the first section 104 and that works by incorporating various screen-printable materials onto a flexible thin circuit portion that is essentially the same as section 104 of the first embodiment. In this embodiment, the flexible thin portion includes a first thin base layer 106 that has a first portion of a flexible electrical circuit formed thereon. A second layer (not shown in FIG. 5) containing the second portion of the electrical circuit is made of screen printable material. Then, instead of a computer interface, this embodiment includes a third and last layer 156 in the pad display portion that consists of a heat sensitive thermoionic ink. This is important because at a controllable transition temperature, for example, at 90° F., thermoionic ink will change color, turning from black to white.

Accordingly, instead of the computer interface and computer second section, a long member 160 extending from and connected electrically by traces or strips 110 to the first section 104 of the tool is provided. On the long extension member 160, rows 156 of small normally black colored pads are provided, and each pad 156 is formed over or associated individually with one of the conductive strips 110 of the first thin section 104. As such, when the two nip forming rolls 62, 64 are engaged as above over the first section 104 of the tool, some of the pads on the long member will turn from black to white. Each of these pads changes color, turning from black to white, when the strip connected to the particular pad has been caused as described above, by nip contact pressure to touch the conductive contact finger on the other layer. When a contact strip 110 makes contact with the contact finger 114, it completes an electrical circuit that allows current to flow to the extension portion and there pass through a layer 162 of resistive ink. The passing current acts to heat the thermoionic ink 156 past its transition temperature, which is approximately 90° F., thereby changing the color of thermoionic pad from black to white. Therefore, by counting the number of white pads and multiplying this number by the strip-to-strip spacing, it is again possible to determine the actual contact width or arc of the nip 102.

After each such use, the tool is removed from the high temperature nip and allowed to cool. As the flex material of the tool cools, the thermionic ink will change back to it original state, and original color black. This, thus allows for repeatable use of this embodiment of the tool in the field. As can be appreciated, this version of the tool is made essentially from all low cost standard materials that are easy to screen print onto the flex circuit. The entire flexible tool could be rolled up into a tube and carried conveniently as a field repair tool.

Figure 6:
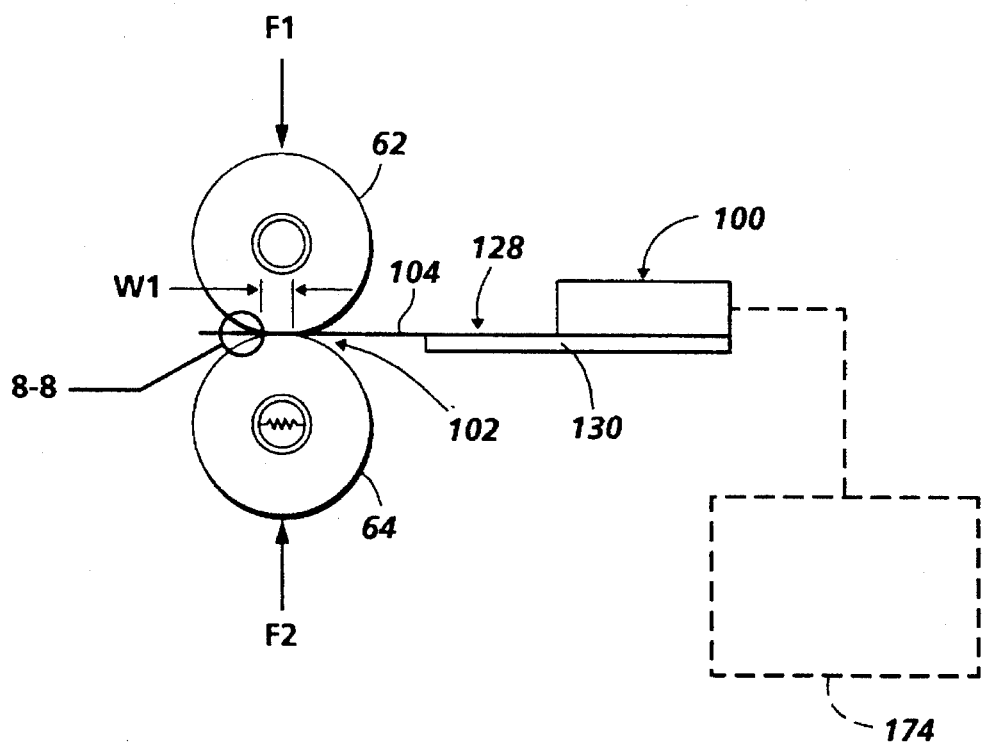
FIG. 6 is an illustration of the tool of the present invention being used at a fusing apparatus.
Figure 7:
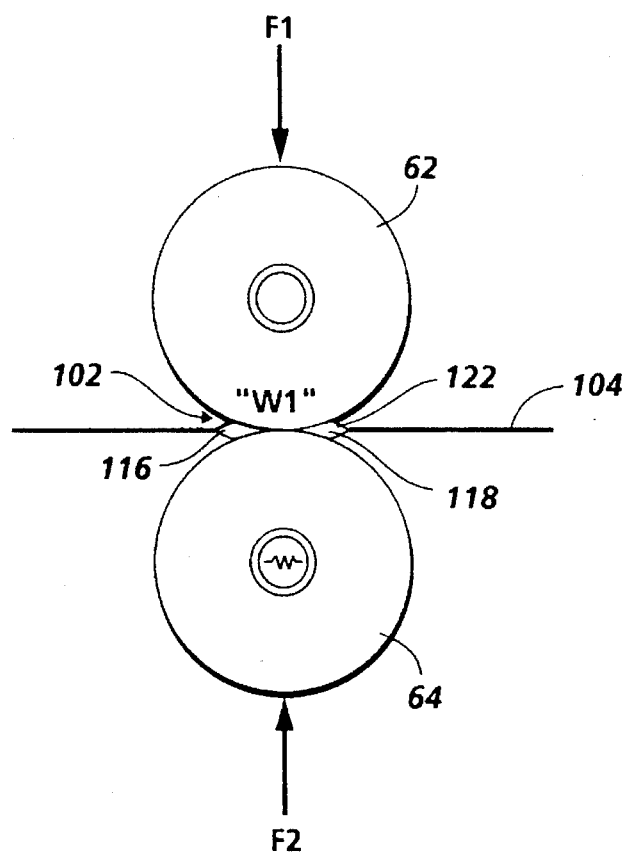
FIG. 7 is an enlarged view of the tool of the present invention in use in a fusing nip of the fusing apparatus of FIG. 6.
Figure 8:
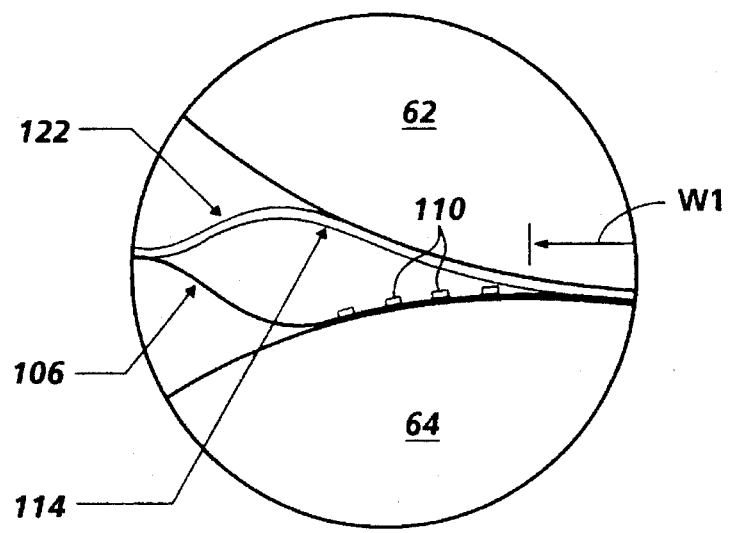
FIGS. 8 are detailed illustrations of the behavior of an air inflated flexible circuit portion of the tool of the present invention within the fusing nip of FIG. 7.

Referring now to FIGS. 6 to 8, the method of the present invention for measuring a contact width "W1" of a high temperature roll nip 102 that is formed by two rollers 62, 64 includes the step of inserting into the roll nip 102, a thin section 104, of the roll nip tool 100. The thin section consists of the first and second thin members or films 106, 122 forming an air pocket 118. In an electrophotographic reproduction machine 10, the thin first section 104 of the tool consisting of the first and second films 106, 122 is inserted into the open fusing nip 102 formed between the fuser roll 62 and the pressure roll 64. The entire nip width preferably should be within the operating window of the tool. After inserting the thin section between the rolls, a source of pressurized air 176 connected to the tool through a solenoid 136 and air pressure sensor 138, inflates the air pocket 118 with air 116. In general, introducing into the pocket 118 any non-conductive means, such as the pressurized air, will serve to separate the conductive strips 110 on the first surface of the first thin member or film 106 from the conductive contact finger 114 on the second surface of the second thin member or film 122. Air pressure entering the tool may be reduced to working pressure, for example, using an air bleed valve or air pressure sensor 138 as shown. As also shown, the pressurized air functions in areas of non-contact between the rolls 62, 64 to hold each thin film apart (FIG. 8) from each other and against the immediately adjacent roll. As such, the two surfaces of the films with the first and second portions 120, 126 of the electrical circuit thereon are held apart and hence in an open state. Forcing the films apart and into the open state as such allows for, and enables, a person to check for electrical continuity only where the films are forced back together (W1) by external force F1, F2, for example.

The method then includes the step of applying contact pressure in the form of the forces F 1, F2 to the fusing rollers to bring the first surface of the first thin member or film 106 into circuit closing contact, in a roll-contacting area "W1" of the nip 102, with the second surface of the second thin member or film 122. When the rolls are caused to engage, thereby closing the nip, the number of strips 110 brought into circuit-closing contact with the conductive contact finger 114 determines the actual contact arc or effective nip footprint W1, that is, the width of the fusing nip 102 between the two rolls.

The method of the present invention, finally includes the step of calculating the contact arc or width W1 of the fuser nip 102 by determining the number of axially extending conductive strips 110 that are brought into such circuit closing contact with the conductive contact finger 114 as a result of loading the rolls 62, 64. This can be achieved by using various techniques, including programmed computer control and calculations. With such techniques, it is possible to determine how many of the interdigitated strips 110 have been caused by pressure in the nip contact areas to come into contact with the conductive contact finger 114. This determined number of strips is then multiplied by a given standard strip-to-strip spacing, for example, 4 mils of the contact strips. The result is the contact width or arc measurement W1 for the roll nip 102 between the rolls at the particular section of the nip where the tool was inserted.

To determine the number of strips making contact with the contact finger in this computerized version of the tool, the programmed computer 174, for example, can scan all of the strips 110 to determine which of them are actually touching the contact finger 114, as indicated by their closed electrical circuits. Information retrieved from such scanning can then be manipulated by the computer 174 in order to output an actual contact width or arc measurement W1 for any section measured by the tool along the length or axis of the rolls.

More specifically, it is advisable to insert the tool into the roll or fuser nip first from one side of the roll assembly, engage the two rolls and read or determine the nip width W1. From such measurements an operator can determine where and how much to adjust in terms of in-loading pressure so as to bring the pressure distribution along the length and width of the nip within a predetermined tolerance ranged.

While the invention has been described with particular reference to a preferred embodiment, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A roll nip tool for making nip width measurements within a high temperature roll nip, the tool comprising:
   (a) a first thin section for inserting into a high temperature roll nip, said first thin section including:
      (i) a first thin member having a first surface and a first portion of an electrical circuit on the first surface;
      (ii) a second thin member having a second surface and a second portion of the electrical circuit formed on said second surface, said first thin member and said second thin member being arranged such that said first and said second portions of the electrical circuit can be brought into circuit closing contact; and
      (iii) means for controllably separating said first and said second portions of the electrical circuit; and (b) a second section connected to said first thin section and including means for indicating closing contact between said first and said second portions of the electrical circuit.

2. The roll nip tool of claim 1, wherein said first thin section is flexible.

3. The roll nip tool of claim 1, wherein said first portion of the electrical circuit formed on said first surface includes a series of parallel conductive strips running in a first direction.

4. The roll nip tool of claim 1, wherein said second portion of the electrical circuit formed on said second surface of said second thin member includes a set of parallel conductive fingers running in a second direction.

5. The roll nip tool of claim 1, wherein said first thin member and said second thin member each consist of a polyimide film material.

6. The roll nip tool of claim 1, wherein said first thin member includes a plurality of first portions of a corresponding plurality of electrical circuits formed on said first surface.

7. The roll nip tool of claim 1, wherein said means for controllably separating said first and said second portions of the electrical circuit includes a fluid pocket formed by said first surface of said first section being attached around said first portion of the electrical circuit to said second surface, and means for selectively supplying a pressurized non-conductive fluid into said fluid pocket for separating said first portion from said second portion of the electrical circuit.

8. The roll nip tool of claim 1, wherein said second section includes a computer interface module and means for reading a number of axially extending conductive strips of said first portion brought into circuit closing contact with a crossing conductive finger of said second section.

9. The roll nip tool of claim 3, wherein each strip of said series of parallel conductive strips is about 4 mils wide.

10. The roll nip tool of claim 3, wherein said series of parallel conductive strips has a strip-to-strip spacing of about 4 mils.

11. The roll nip tool of claim 3, wherein said first thin member is assembled within the tool such that when in use within a roll nip formed by two rollers, said first direction of said series of parallel conductive strips is parallel to the axes of the two rollers.

12. The roll nip tool of claim 3, wherein the conductive finger is connected to an operational amplifier.

13. The roll nip tool of claim 4, wherein each finger of said set of parallel conductive fingers is about 4 mils wide.

14. The roll nip tool of claim 4, wherein said set of parallel conductive fingers includes a first finger for location towards a first end of said first surface, a second finger for locating towards a second end of said first surface, and a third finger for locating midway between said first and said second ends of said first surface.

15. The roll nip tool of claim 4, wherein said second thin member is assembled within the tool such that when in use within a roll nip formed by two rollers, said second direction of said set of parallel conductive fingers is perpendicular to the axes of the two rollers.

16. The roll nip tool of claim 5, wherein said first portion of the electrical circuit is comprised of a series of parallel copper strips formed on said first surface by chemical etching.

17. The roll nip tool of claim 5, wherein said second portion of the electrical circuit is comprised of a copper finger formed on said second surface by chemical etching.

18. The roll nip tool of claim 5, wherein said first and said second portions of the electrical circuit are comprised of chemically etched copper traces including a tin coating for preventing copper oxidation.

19. The roll nip tool of claim 5, including a source of electrical power consisting of a battery for powering the electrical circuit.

20. The roll nip tool of claim 6, wherein said plurality of first portions comprises three first portions of three corresponding electrical circuits formed on said first surface.

21. The roll nip tool of claim 6, wherein said three first portions of the three corresponding electrical circuits are formed aligned with one another.

22. The roll nip tool of claim 7, wherein said means for selectively supplying a pressurized non-conductive fluid comprises an air cylinder for supplying pressurized air.

23. The roll nip tool of claim 22, including an air pressure sensor for controlling the pressure of air within said fluid pocket.

24. The roll nip tool of claim 8 including means for storing a strip-to-strip spacing value and for calculating a contact width for a measured roll nip using a determined number of first portion strips brought into circuit closing contact with said second portion crossing finger by roll nip contacting pressure.

25. The roll nip tool of claim 12 wherein each said operational amplifier has an analog mode and a digital mode of operation.

26. The roll nip tool of claim 6, wherein there are three first portions, said portions include one first portion formed towards one end of said first surface, another first portion formed towards an opposite end of said first surface, and a third first portion formed midway between the one and the another first portions of an electrical circuit.

27. A method of measuring a contact width of a high temperature roll nip formed by two rollers, the method comprising the steps of:

(a) inserting into the roll nip formed by the two rollers, a thin section, of a roll nip tool, including a first thin member and a second thin member forming a non-conductive fluid pocket;

(b) applying contact pressure to the rollers to bring a first surface of the first thin member having a series of equally spaced apart conductive strips extending axially relative to the rollers, and each forming a first portion of an electrical circuit, into circuit closing contact with a second surface of the second thin member having a conductive finger extending perpendicularly to the axes of the fusing rollers and forming a second portion of the electrical circuit;

(c) introducing into the fluid pocket a non-conductive fluid for separating the conductive strips on the first surface of the first thin member from the conductive finger on the second surface of the second thin member; and (d) calculating a contact width of the roll nip by determining a number of axially extending conductive strips held in circuit closing contact with the conductive finger, and multiplying such number by a strip-to-strip spacing value.

28. The method of claim 27, wherein said introducing step comprises introducing pressurized air into the fluid pocket.

* * * * *